United States Patent
Bi et al.

(10) Patent No.: US 12,324,368 B2
(45) Date of Patent: Jun. 10, 2025

(54) AERIAL SEEDING BIOREMEDIATION METHOD FOR COAL MINING SUBSIDENCE AREA

(71) Applicants: Xi'an University of Science and Technology, Xi'an (CN); China University of Mining and Technology (Beijing), Beijing (CN)

(72) Inventors: Yinli Bi, Xi'an (CN); Shaopeng Ma, Beijing (CN); Yakun Gao, Beijing (CN); Longjie Zhang, Beijing (CN); Huili Zhou, Beijing (CN)

(73) Assignees: XI'AN UNIVERSITY OF SCIENCE AND TECHNOLOGY, Xi'An (CN); CHINA UNIVERSITY OF MINING AND TECHNOLOGY (BEIJING), Beijing (CN)

( * ) Notice: Subject to any disclaimer, the term of this patent is extended or adjusted under 35 U.S.C. 154(b) by 716 days.

(21) Appl. No.: 17/586,056

(22) Filed: Jan. 27, 2022

(65) Prior Publication Data
US 2022/0248597 A1     Aug. 11, 2022

(30) Foreign Application Priority Data
Feb. 9, 2021  (CN) .......................... 202110178130.4

(51) Int. Cl.
  *A01C 21/00*     (2006.01)
  *A01C 7/08*      (2006.01)
  *B64U 101/32*    (2023.01)
(52) U.S. Cl.
  CPC ............... *A01C 21/00* (2013.01); *A01C 7/08* (2013.01); *B64U 2101/32* (2023.01)
(58) Field of Classification Search
  CPC ................................. A01C 21/00; A01C 7/08
  See application file for complete search history.

(56) References Cited

U.S. PATENT DOCUMENTS 3,920,184 A * 11/1975 Waldrum ................. B64D 1/16
                                                 239/10
3,968,933 A *  7/1976 Waldrum ............... A01C 7/004
                                                 239/263.1
(Continued)

FOREIGN PATENT DOCUMENTS

CN      109240304 A      1/2019
CN      111615988 A      9/2020

OTHER PUBLICATIONS

Forest Ecology and Management, Forest restoration on steep slopes after coal surface mining in Appalachian USA: Soil grading and seeding effects, Apr. 15, 2012, vol. 270, pp. 126-134 (Year: 2012).*

(Continued)

*Primary Examiner* — Jamie L McGowan
(74) *Attorney, Agent, or Firm* — HAUPTMAN HAM, LLP

(57) ABSTRACT

An aerial seeding bioremediation method for a coal mining subsidence area. The method includes obtaining a topographic map of the coal mining subsidence area; grading the topographic map in terms of ground slopes; determining seeding coefficients of aerial seeding operation according to a grading result of the ground slopes and ground coverage rates of the coal mining subsidence area; determining height adjustment parameters during unmanned aerial vehicle, UAV, aerial seeding; and performing, by a UVA, the aerial seeding operation according the grading result of the ground slopes, the seeding coefficients of the aerial seeding operation, and the height adjustment parameters. A slop grading technical standard of aerial seeding determined by the method of the present disclosure is applicable to complex topography of the coal mining subsidence area and helps with safety of the UVA.

2 Claims, 2 Drawing Sheets

(56) References Cited

U.S. PATENT DOCUMENTS

| | | | | |
|---|---|---|---|---|
| 11,337,358 B2* | 5/2022 | Fletcher | ................. | B64U 10/14 |
| 2008/0250991 A1* | 10/2008 | Werth | .................... | A01C 21/00 |
| | | | | 111/130 |
| 2016/0234997 A1* | 8/2016 | Camacho | ............... | A01C 11/00 |
| 2018/0263170 A1* | 9/2018 | Aghai | ...................... | B64D 1/08 |
| 2022/0248597 A1* | 8/2022 | Bi | ....................... | A01C 21/005 |
| 2022/0267228 A1* | 8/2022 | Song | ..................... | A01G 18/22 |

OTHER PUBLICATIONS

NRCS Missouri, Aerial Seeding of Cover Crops Information Sheet, Mar. 2010 (Year: 2010).*

First Office Action issued in corresponding Chinese Application No. 202110178130.4; mailed Oct. 27, 2021; 19 pgs.

* cited by examiner

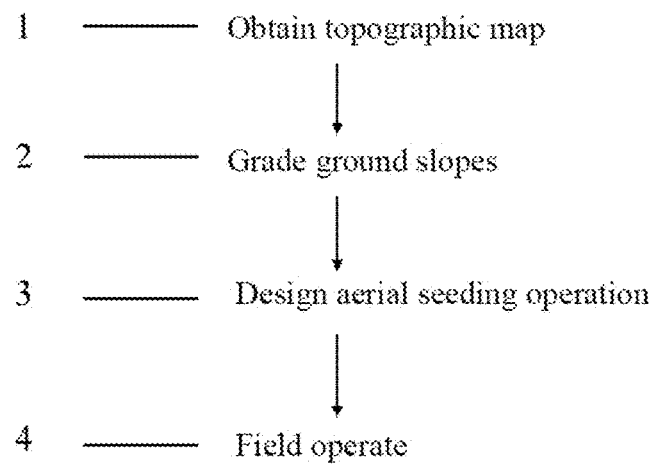
Fig. 1
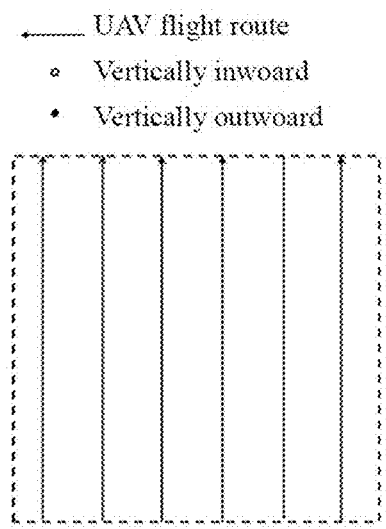
Fig. 2(a) Top View
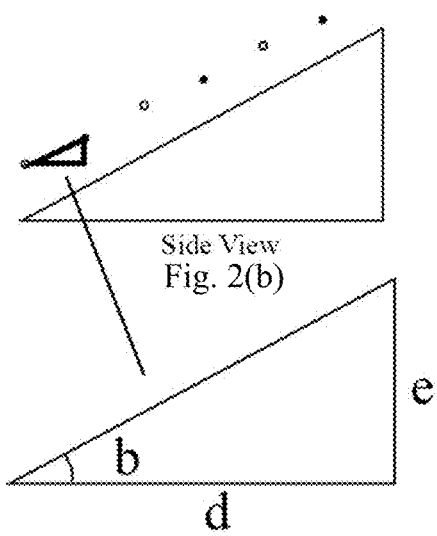
Fig. 2(b) Side View
Fig. 2(c) Height Adjustment Calculation

AERIAL SEEDING BIOREMEDIATION METHOD FOR COAL MINING SUBSIDENCE AREA

RELATED APPLICATIONS

The present application claims priority from Chinese Application Number 202110178130.4, filed Feb. 9, 2021, the disclosure of which is hereby incorporated by reference herein in its entirety.

FIELD OF THE INVENTION

The present disclosure relates to an aerial seeding bioremediation method for a coal mining subsidence area, which belongs to the field of ecological remediation.

BACKGROUND OF THE INVENTION

Western China is located in an arid and semi-arid area with a fragile ecological environment. Underground coal mining has caused movements of rock stratums and ground surface, destabilized the surface soil, and disturbed the growth of surface plants. The ecological environment of a coal mining area has a certain self-repair ability, but the natural restoration speed thereof is relatively slow. How to rapidly and efficiently restore the ecology of the coal mining area is the key of solving the environmental problems in this area. At the same time, after coal mining of underground mines, there is a large degree of surface fragmentation and even place difficult to be reached by people, which limits implementation of traditional artificial close-range remediation methods.

Unmanned aerial vehicle (UAV) aerial seeding technology has started as early as the 20th century, and ecological remediation workers adopted aerially seeded grass seeds to increase surface plant coverage. Around 2020, the UAV aerial seeding technology developed rapidly, and aerial seeding operations were mostly applied to rice aerial seeding, rapeseed aerial seeding, grassland seed aerial seeding. These operating environments are either farmland or grassland, which have relatively good ground environment as the farmland is flat and the grassland has low terrain relief, so that they have a small impact on operation safety of a UAV and are suitable for large-area aerial seeding by the UAV. However, in a coal mining subsidence area, the ground is broken and undulating severely. This environment restricts application and promotion of the UAV aerial seeding technology on vegetation restoration in coal mining areas, and seeding operation without taking a ground slope and a ground coverage rate in to account would also waste seeds. Therefore, for ecological remediation at coal mining areas, there is an urgent need to provide an efficient and reasonable aerial seeding bioremediation method applicable to those coal mining subsidence areas.

SUMMARY OF THE INVENTION

An objective of the present disclosure is to provide an aerial seeding bioremediation method for a coal mining subsidence area so as to provide technical support for ecological remediation of a coal mine reclamation area.

The aerial seeding bioremediation method for a coal mining subsidence area provided by the present disclosure includes steps of:

S1, obtaining a topographic map of the coal mining subsidence area;

S2, grading the topographic map in terms of ground slopes;

S3, determining seeding coefficients of aerial seeding operation according to a grading result of the ground slopes and ground coverage rates of the coal mining subsidence area;

S4, determining height adjustment parameters during unmanned aerial vehicle (UAV) aerial seeding; and S5, performing, by a UVA, the aerial seeding operation according the grading result of the ground slopes, the seeding coefficients of the aerial seeding operation, and the height adjustment parameters.

In the above-mentioned aerial seeding bioremediation method, in the step S1, the topographic map of the coal mining subsidence area is acquired through a digital surveying and mapping method or UAV mapping.

In the above-mentioned aerial seeding bioremediation method, in the step S2, the topographic map of the coal mining subsidence area is divided into a gridded mining area topographic map with grids of 50~100 m so as to grade the slopes.

Through grading of the slops, facilitated is not only data processing, but also flight route planning of the UAV aerial seeding and actual flight aerial seeding operation.

Preferably, the slopes are divided into the following grade levels:
1) a slope which is <15° is a level-one slope; 2) a slope which is 15°~25° is a level-two slope; 3) a slope which is 25°~35° is a level-three slope; 4) a slope which is of 35°~60° is a level-four slope; and 5) a slope which is 60°~90° is a level-five slope.

In the above-mentioned aerial seeding bioremediation method, in the step S3, a slop seeding coefficient is obtained according to the grading result of the slops;

The product of the slop seeding coefficient and a ground coverage seeding coefficient is a seeding coefficient of the aerial seeding operation; and The ground coverage seeding coefficient is assigned a value according to a level of a ground coverage rate.

Specifically, the ground coverage seeding coefficient is determined according to the following a)-d):
a) a ground coverage rate which is 80%-100% is a level-one coverage rate, for which there is no need to sow grass seeds;
b) a ground coverage rate which is 50%-80% is a level-two coverage rate, for which the ground coverage seeding coefficient is set to 0.5;
c) a ground coverage rate which is 20%-50% is a level-three coverage rate, for which the ground coverage seeding coefficient is set to 0.8;
d) a ground coverage rate which is 0%-20% is a level-four coverage rate, for which the ground coverage seeding coefficient is set to 1.0, that is, taking a ground coverage rate of 0 as a unit of 1.

The ground coverage rates of the present disclosure may be statistically metered through field survey or UAV aerial photography, and no statistics is performed on tree.

Specifically, the slope seeding coefficient takes the case of flat land as a unit of 1, and it is obtained by Formula (1):

$$a = \frac{1}{\cos(b)} \tag{1}$$

In the Formula (1), a represents the slope seeding coefficient, and b represents the maximum slope within a grade level of slope.

In the aerial seeding bioremediation method of the present disclosure, because of existence of ground slopes, during the aerial seeding of the UVA it is necessary to establish a flight route perpendicular to a direction of a slop and start the operation from the highest or lowest location of the slope. Since the fact that contour lines have varied spacing extent therebetween, it can only be ensured that a direction of the flight route is perpendicular to a direction of main slope (the direction of main slope refers to main trend of a slope of an aerial seeding unit). Because of existence of the slopes, under an autonomous mode during the aerial seeding, adjacent flight routes always have different distances from the ground with each other, so that a height of the UAV still requires manual auxiliary adjustment. An approach for determining the height adjustment parameters is as follows:

Taking d as a UAV aerial seeding width and e as a UAV height adjustment parameter, a schematic diagram is shown in FIGS. 2(a)-2(c), in which FIG. 2(a) is a top view of the UAV aerial seeding, FIG. 2(b) is a side view of the UAV aerial seeding, and FIG. 2(c) is a schematic diagram of UAV height adjustment calculation. A calculation formula of the height adjustment parameter is shown in Formula (2), in which b represents the maximum slope within a grade level of slope:

$$e = d \times \tan(b) \quad (2)$$

(1) In the case that operation is started from the highest location of a slope, manual auxiliary adjustment is required to lower the flight height of the UAV by e while the UAV turns to a direction by its own; (2) in the case that operation is started from the lowest location of the slope, manual auxiliary adjustment is required to increase the flight height of the UAV by e while the UAV turns to a direction by its own. As such, it is ensured that distances from the UAV to its straight below site are roughly identical during the aerial seeding.

The grade levels of ground slope, the seeding coefficients of the aerial seeding operation and the height adjustment parameters determined by the present disclosure can guide actual aerial seeding operation. The ground slope has an important impact on safe operation of the UAV. Therefore, flight needs to be operated by taking the grade levels of slope as the primary grading standard, and then operated according to a ground coverage rate in each grade level of slope. The lowest coverage rate in each unit of grade level of slope is statistically metered to serve as the ground coverage rate in the unit of grade level.

The bioremediation method of the present disclosure is designed based on actual situation of ground subsidence in the coal mining subsidence area, and has the following advantages that:

(1) Slop grading technical standard of aerial seeding determined by the method of the present disclosure is applicable to complex topography of the coal mining subsidence area and ensures safety of UVAs;

(2) Seeding amounts are graded and set according to the ground coverage rates so that efficient and accurate seeding can be implemented;

(3) The determined height adjustment parameters can ensure that the UAV maintains approximately the same vertical distance from the ground all the time within the unit operating range; and (4) Remote control operation of the UAV aerial seeding avoids an impact on the environment due to personnel entering the coal mining subsidence area, and can save labor costs.

BRIEF DESCRIPTION OF THE DRAWINGS

FIG. 1 is a flow chart of an aerial seeding bioremediation method for a coal mining subsidence area according to the present disclosure.

FIGS. 2(a)-2(c) are schematic diagrams showing height adjustment of UAV aerial seeding.

DETAILED DESCRIPTION OF THE EMBODIMENTS

The experimental approaches used in the following embodiments are all routine methods unless otherwise specified herein.

The materials and reagents used in the following embodiments are all available commercially unless otherwise specified herein.

Provided by the present disclosure is an aerial seeding bioremediation method for a coal mining subsidence area, a flow chart of which is shown in FIG. 1, and the method includes the following steps.

S1, a topographic map of a coal mining subsidence area is obtained;

S2, the topographic map is graded in terms of ground slopes;

S3, seeding coefficients of aerial seeding operation are determined according to a grading result of the ground slopes and ground coverage rates of the coal mining subsidence area;

S4, height adjustment parameters during unmanned aerial vehicle (UAV) aerial seeding are determined; and S5, the aerial seeding operation is performed by a UVA according to the grading result of the ground slopes, the seeding coefficients of the aerial seeding operation, and the height adjustment parameters.

In the present disclosure, seeding amounts are graded and set according to the ground coverage rates, so that efficient and accurate seeding can be implemented; the height adjustment parameters provided by the present disclosure can ensure that the UAV maintains an approximately identical vertical distance from the ground all the time within a unit operating range.

Embodiment 1, Design of Aerial Seeding Test at a Coal Mining Subsidence Area of Ningtiaota Coal Mine 1. Overview of Test Area A test site is located in Ningtiaota Coal Mine District, Shenmu City, Yulin City, Shaanxi Province, which belongs to the Loess Plateau area, and in which underground coal mining has caused surface subsidence.

2. Materials and Equipment (1) Designed seed for the test: *Medicago sativa* (*Medicago sativa* L.).

(2) A UAV for the test is Tiantu M8A PRO, a maximum load capacity of which is 20 kg.

3. Processing Flow (1) Obtaining a Topographic Map

A topographic map is measured and obtained through a digital surveying and mapping method. A designed area is 2100 mu (1400007 square meters), and ground slopes are between 1.94° ~59.04°.

(2) Grading Ground Slopes

Figure 3:
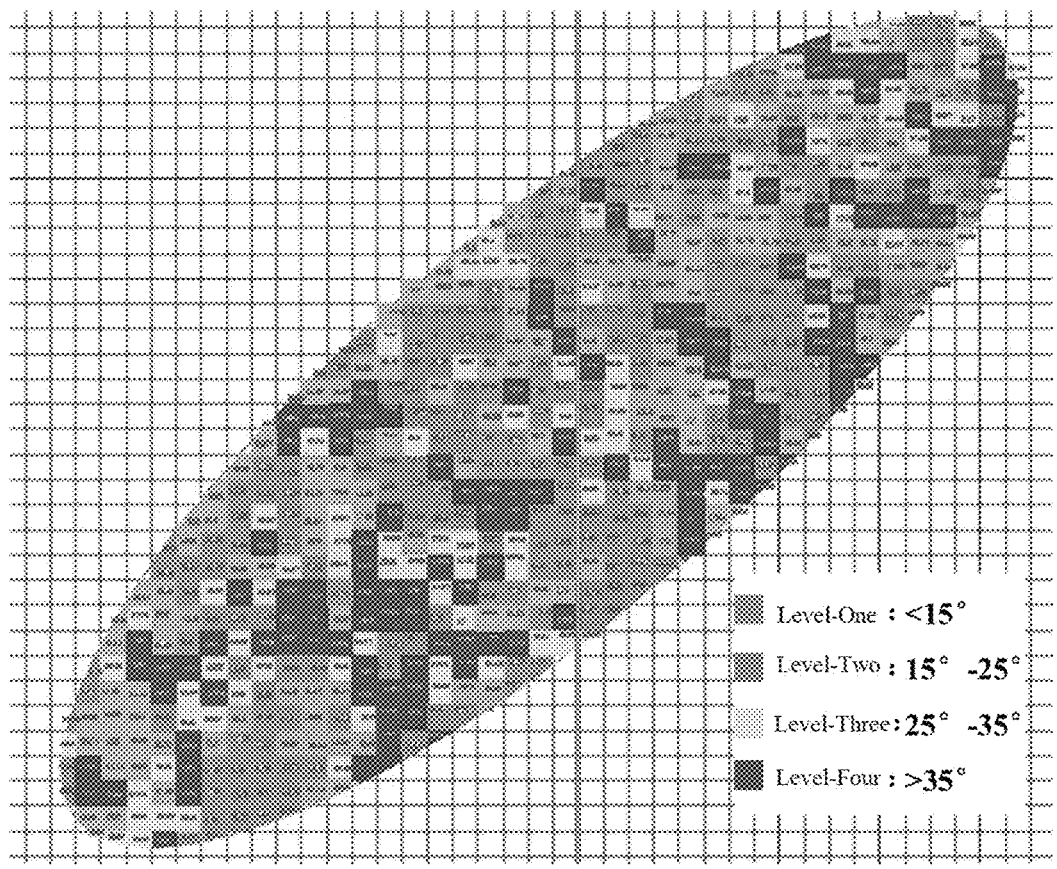
FIG. 3 is a ground slope grading map of Ningtiaota's aerial seeding design.

Using AutoCAD drawing software, the topographic map of the mining area is analyzed by being gridded with an accuracy of 50 m, and a grading result of the ground slopes (FIG. 3) is that a level-one slope covers an area of 37.48%, an actual area of which is 787.08 mu (524722.6236 square meters); a level-two slope covers an area of 27.14%, an actual area of which is 569.94 mu (379961.8998 square meters); a level-three slop covers an area of 14.86%, an actual area of which is 312.06 mu (208041.0402 square meters); a level-four slop covers an area of 20.52%, an actual area of which is 430.92 mu (287281.4364 square meters).

(3) Designing Aerial Seeding Operation

After field investigation, it is found that an average extent of ground coverage at this area is between 20% and 50%. There are still some zones with coverage rates higher than 50%, but geographical distribution of them is relatively scattered. Taking the lowest ground coverage rate of an aerial seeding unit as the criterion, a ground coverage rate is accordingly set to be three-level, which is convenient for operation. Field operation is classified into operation classes according to the grade levels of ground slope and the ground coverage rates, which includes the following four classes: an operation design for level-two ground slope and level-three ground coverage rate, in which a seeding coefficient is set to be 0.832; an operation design for level-two ground slope and level-three ground coverage rate, in which a seeding coefficient is 0.880; an operation design for level-three ground slope and level-three ground coverage rate, in which a seeding coefficient is 0.976; and an operation design for level-four ground slope and level-three ground coverage rate, in which a seeding coefficient is 1.600, as shown in Table 1, where a slope seeding coefficient is obtained according to above Formula (1).

Through data processing by the method of the present disclosure, originally relatively broken and complex terrain in the coal mining subsidence area of Ningtiaota Coal Mine is more accessible to practical operation after being graded in terms of the slopes. By designing the height adjustment parameters of the aerial seeding, it can ensure that the UAV keeps an approximately identical vertical distance from the ground all the time within a range of an operation unit. A ground slope seeding coefficient is designed in accordance with the ground slope, which takes into account an objective situation that an area of a sloped area is larger than a projected area of its own. Also, the ground coverage rates are graded for designing a seeding coefficient so as to avoid a problem of insufficient seeding or excessive consumption of sowed seeds.

Embodiment 2. Design of Aerial Seeding Test at a Coal Mining Subsidence Area of Zhangjiamao Coal Mine 1. Overview of Test Area A test site is located in Miaoyan Village, Ningtiaota Coal Mine District, Shenmu City, Yulin City, Shaanxi Province, which belongs to the Loess Plateau, and in which underground coal mining has caused surface subsidence.

2. Materials and Equipment (1) Designed seed for the test: *Medicago sativa*.

(2) A UAV for the test is Tiantu M8A PRO, a maximum load capacity of which is 20 kg.

3. Processing Flow (1) Obtaining a Topographic Map

A topographic map is measured and obtained through a digital surveying and mapping method. A designed area is 1000 mu (666667 square meters), and a range of ground slopes is between 0° and 54.21°.

(2) Grading Ground Slopes

Using AutoCAD drawing software, the topographic map of the mining area is analyzed by being gridded with an accuracy of 50 m, and a grading result of the ground slopes

TABLE 1

Seeding Coefficients of Aerial Seeding Operation Designs

| Slope | | Coverage | | | |
|---|---|---|---|---|---|
| | | Level-one 80%-100% | Level-two 50%-80% | Level-three 20%-50% | Level-four 0%-20% |
| Level-one | <15° | High coverage, no grass seed needs to be seeded | 1.04 × 0.5 = 0.520 | 1.04 × 0.8 = 0.832 | 1.04 × 1.0 = 1.040 |
| Level-two | 15°-25° | | 1.10 × 0.5 = 0.550 | 1.10 × 0.8 = 0.880 | 1.10 × 1.0 = 1.100 |
| Level-three | 25°-35° | | 1.22 × 0.5 = 0.610 | 1.22 × 0.8 = 0.976 | 1.22 × 1.0 = 1.220 |
| Level-four | 35°-60° | | 2.00 × 0.5 = 1.000 | 2.00 × 0.8 = 1.600 | 2.00 × 1.0 = 2.000 |
| Level-five | >60° | Aerial seeding height is higher than the aerial seeding area, a seeding amount depends on a coefficient corresponding to a grade level of the coverage rate | | | |

Note:
data in the table complying with: a slope seeding coefficient × a ground coverage seeding coefficient = a seeding coefficient.

An aerial seeding width is set to 5 m. According to above Formula (2), it is determined that a height adjustment parameter for the level-one ground slope is 1.34 m (a value of b is 15°), a height adjustment parameter for the level-two ground slope is 2.34 m (a value of b is 25°), a height adjustment parameter for the level-three ground slope is 3.5 m (a value of b is 35°), and a height adjustment parameter for the level-four ground slope is 8.7 m (a value of b is 60°).

Figure 4:
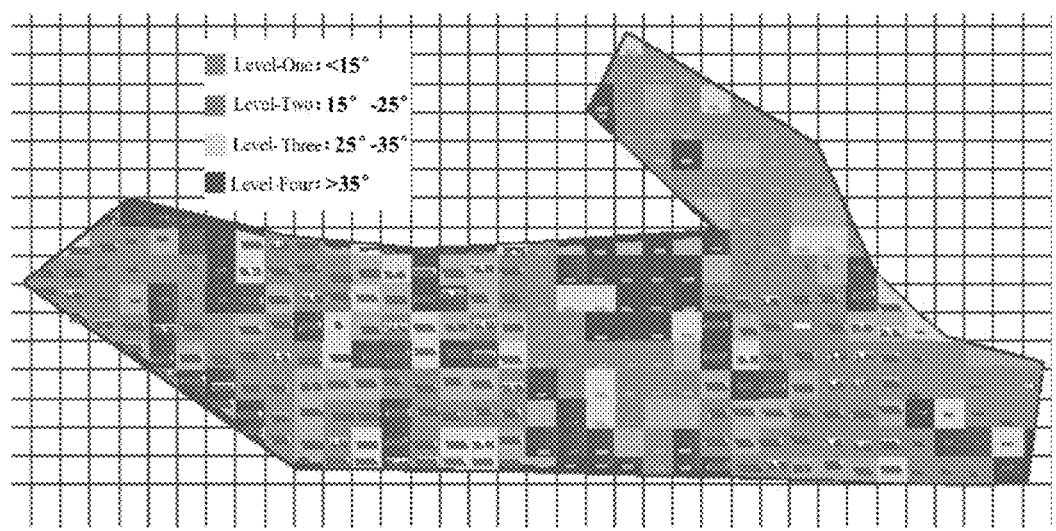
FIG. 4 is a ground slope grading map of Zhangjiamao's aerial seeding design.

(FIG. 4) is that a level-one slope covers an area of 46.83%, an actual area of which is 468.3 mu (312201.561 square meters); a level-two slope covers an area of 10.92%, an actual area of which is 109.2 mu (72,800.364 square meters); a level-three slope covers an area of 20.42%, an actual area of which is 204.2 mu (136,134.014 square meters); a level-four slope covers an area of 21.83%, an actual area of which is 218.3 mu (145534.061 square meters).

(3) Designing Aerial Seeding Operation

After investigation, it is found that an average degree of ground coverage at this area is between 20% and 45%. There are still some zones with coverage rates higher than 45%, but geographical distribution of them is relatively scattered. Taking the lowest ground coverage rate of an aerial seeding unit as the criterion, a ground coverage rate is accordingly set to be level-three, which is convenient for operation. Field operation is classified into operation classes according to the grade levels of ground slope and the ground coverage rates, which includes the following four classes: an operation design for level-two ground slope first and level-three ground coverage rate, in which a seeding coefficient is set to be 0.832; an operation design for level-two ground slope and level-three ground coverage rate, in which a seeding coefficient is 0.880; an operation design for level-three ground slope and level-three ground coverage rate, in which a seeding coefficient is 0.976; and an operation design for level-four ground slope and level-three ground coverage rate, in which a seeding coefficient is 1.600, as shown in the Table 1.

An aerial seeding width is set to 5 m. According to above Formula (2), it is determined that a height adjustment parameter for the level-one ground slope is 1.34 m (a value of b is 15°), a height adjustment parameter for the level-two ground slope is 2.34 m (a value of b is 25°), a height adjustment parameter for the level-three ground slope is 3.5 m (a value of b is 35°), and a height adjustment parameter for the level-four ground slope is 8.7 m (a value of b is 60°).

Through data processing by the method of the present disclosure, originally relatively broken and complex terrain in the coal mining subsidence area of Zhangjiamao Coal Mine is more accessible to practical operation after being graded in terms of the ground slopes. By designing the height adjustment parameters of the aerial seeding, it can ensure that the UAV keeps an approximately identical vertical distance from the ground all the time within a range of an operation unit. A ground slope seeding coefficient is designed in accordance with the ground slope, which takes into account an objective situation that an area of a sloped area is larger than a projected area of its own. Also, the ground coverage rates are graded for designing a seeding coefficient so as to avoid a problem of insufficient seeding or excessive consumption of sowed seeds.

Embodiment 3: Aerial Seeding Test of *Medicago sativa* Seeds at a Coal Mining Subsidence Area of Zhangjiamao Coal Mine 1. Overview of Test Area A test site is located in Muguashu Village, Zhangjiamao Coal Mine District, Shenmu City, Yulin City, Shaanxi Province, which belongs to the Loess Plateau area, and in which underground coal mining has caused surface subsidence and cracks.

2. Materials and Equipment (1) Seed for the test: *Medicago sativa*.

(2) A UAV for the test is Tiantu M8A PRO, a maximum load capacity of which is 20 kg.

3. Processing Flow (1) Obtaining a Topographic Map A topographic map is measured and obtained through a digital surveying and mapping method. A designed area is 15 mu (10000.05 square meters).

(2) Grading Ground Slopes

Ground slopes of the aerial seeding test area are between 25° and 35°, which are in level-three of grade levels of ground slope.

(3) Designing Aerial Seeding Operation

Ground coverage rates are between 20% and 40%, which are in level-three of grade levels of ground coverage rate. An aerial seeding width is set to 5 m, and a height adjustment parameter is set to 3.5 m.

(4) Field Operation

Field operation is designed in accordance with the level-three ground slope and the level-three ground coverage rate, and a seeding coefficient is 0.976 (see Table 1). An autonomous operation mode is adopted with manual operation as auxiliary. A flight height is set to 10 m, a flight speed is 5 m/s, a flight width is 5 m, and a speed of a turnplate is set to low-speed. In the case of flat land per mu with a ground coverage rate of 0, a seeding amount of *Medicago sativa* is set to 5 kg/mu, while in the case of this test area, a seeding amount of the seeds is 4.88 kg/mu. Operation is started from a location with the lowest slope. After each direction turning of the UAV, the height needs to be increased by 3.5 m. Operation time is configured on Jul. 25 to 26, 2019 to carry out the seeding designs and the operation. After the aerial seeding, no personnel are specially arranged to cover soil on the aerially seeded seeds.

4. Results and Analysis

An on-site investigation was conducted on Aug. 29, 2019. Because no personnel were arranged to cover soil on the aerially seeded seeds after the aerial seeding, the investigation indicates that coverage of *Medicago sativa* is 0.3%, which means quite little effect worked on the ground coverage rate. Another on-site investigation was conducted on May 28, 2020. It is found that total coverage in locations intervened by human (e.g., treading during grazing, agricultural harvesting) can reach to 45%-65%. It can be seen that seeding of *Medicago sativa* by the UAV can improve coverage of ground plants to a certain extent, and it is thus indicated that the seeding method of the present disclosure is applicable.

The invention claimed is:

1. An aerial seeding bioremediation method for a coal mining subsidence area, comprising steps of:

S1, obtaining a topographic map of the coal mining subsidence area;

S2, grading the topographic map in terms of ground slopes, wherein, in the step S2, the topographic map of the coal mining subsidence area is divided into a gridded mining area topographic map with grids of 50~100 m so as to grade the ground slopes, wherein, a standard for grading the ground slopes is as follows:

1) A slope which is <15° is a level-one slope; 2) a slope which is 15° ~25° is a level-two slope; 3) a slope which is 25° ~35° is a level-three slope; 4) a slope which is of 35° ~60° is a level-four slope; and 5) a slope which is 60° ~90° is a level-five slope;

S3, determining seeding coefficients of aerial seeding operation according to a grading result of the ground slopes and ground coverage rates of the coal mining subsidence area, wherein, a slop seeding coefficient is obtained according to the grading result of the ground slopes;

a product of the slop seeding coefficient and a ground coverage seeding coefficient is a seeding coefficient of the aerial seeding operation; and the ground coverage seeding coefficient is assigned a value according to a grade level of a ground coverage rate, wherein, the ground coverage seeding coefficient is determined according to the following a)-d):
a) a ground coverage rate which is 80%~100% is a level-one coverage rate, for which there is no need to sow grass seeds;
b) a ground coverage rate which is 50%~80% is a level-two coverage rate, for which the ground coverage seeding coefficient is set to 0.5;
c) a ground coverage rate which is 20%~50% is a level-three coverage rate, for which the ground coverage seeding coefficient is set to 0.8;
d) a ground coverage rate which is 0%~20% is a level-four coverage rate, for which the ground coverage seeding coefficient is set to 1.0, wherein, the slope seeding coefficient is obtained by Formula (1):

$$a = \frac{1}{\cos(b)} \quad (1)$$

in the Formula (1), a represents the slope seeding coefficient, and b represents a maximum slope within a grade level of ground slope;

S4, determining height adjustment parameters during unmanned aerial vehicle, UAV, aerial seeding, wherein, a height adjustment parameter is determined by Formula (2):

$$e = d \times \tan(b) \quad (2)$$

in the Formula (2), e represents the height adjustment parameter, d represents a UAV aerial seeding width, and b represents a maximum slope within a grade level of ground slope; and S5, performing, by a UAV, the aerial seeding operation according the grading result of the ground slopes, the seeding coefficients of the aerial seeding operation, and the height adjustment parameters.

2. The aerial seeding bioremediation method according to claim 1, wherein, in the step S1, the topographic map of the coal mining subsidence area is acquired through a digital surveying and mapping method or UAV mapping.

* * * * *